US010631036B1

(12) United States Patent
Rabbat et al.

(10) Patent No.: US 10,631,036 B1
(45) Date of Patent: Apr. 21, 2020

(54) IDENTIFYING ALTERED DIGITAL VIDEO CONTENT

(71) Applicant: Gfycat, Inc., Palo Alto, CA (US)

(72) Inventors: Richard Rabbat, Palo Alto, CA (US); Ernestine Fu, Northridge, CA (US)

(73) Assignee: Gfycat, Inc., Palo Alto, CA (US)

( * ) Notice: Subject to any disclaimer, the term of this patent is extended or adjusted under 35 U.S.C. 154(b) by 0 days.

(21) Appl. No.: 16/169,804

(22) Filed: Oct. 24, 2018

(51) Int. Cl.
| | |
|---|---|
| *H04N 21/431* | (2011.01) |
| *G06K 9/00* | (2006.01) |
| *G06F 21/51* | (2013.01) |
| *H04N 21/4402* | (2011.01) |

(52) U.S. Cl.
CPC ......... *H04N 21/4318* (2013.01); *G06F 21/51* (2013.01); *G06K 9/00288* (2013.01); *H04N 21/440245* (2013.01)

(58) Field of Classification Search
CPC ........... H04N 21/4318; G06K 9/00288; G06K 9/00295
See application file for complete search history.

(56) References Cited

U.S. PATENT DOCUMENTS

| | | | |
|---|---|---|---|
| 6,785,405 B2 * | 8/2004 | Tuttle ................. | G06K 9/00442 340/5.86 |
| 7,231,628 B2 * | 6/2007 | Pack ........................ | G03F 1/84 716/52 |
| 8,787,627 B1 * | 7/2014 | Freedman .......... | G06K 9/00335 382/115 |

OTHER PUBLICATIONS

"Region Duplication Detection Using Image Feature Matching" Pan, Xunyu and Lyu, Siwei. IEEE Transactions on Information Forensics and Security, vol. 5, No. 4, Dec. 2010. pp. 857-867. (Year: 2010).*

* cited by examiner

*Primary Examiner* — Antonio A Caschera

(57) ABSTRACT

In a computer-implemented method for identifying altered digital video content, a digital video content item is accessed. A visually identifiable region is identified within the digital video content item. A mask is applied to the visually identifiable region of the digital video content item, wherein the mask blocks the visually identifiable region of the digital video content item. The digital video content item with the mask is compared to other digital video content items, wherein the comparing disregards the visually identifiable region according to the mask. Provided the digital video content is identified as similar to at least one other digital video content item, the visually identifiable region of the digital content video item is compared to a visually identifiable region of the at least one other digital video content item. Provided the visually identifiable region of the digital content video item does not match the visually identifiable region of the at least one other digital video content item, it is determined that the digital video content item is altered.

20 Claims, 10 Drawing Sheets

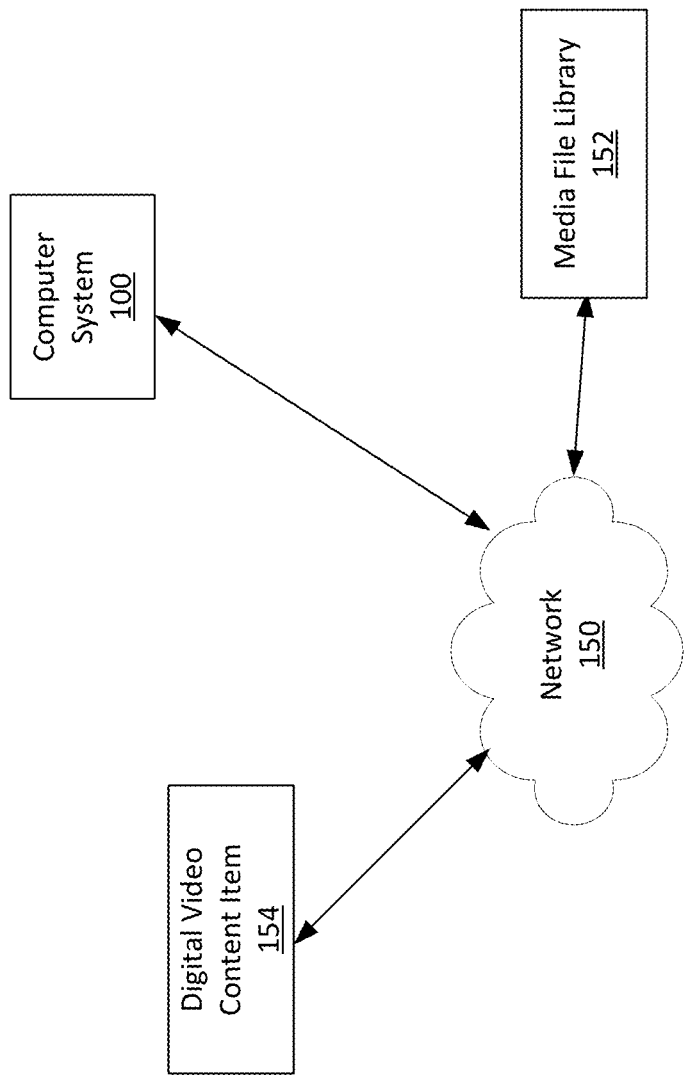

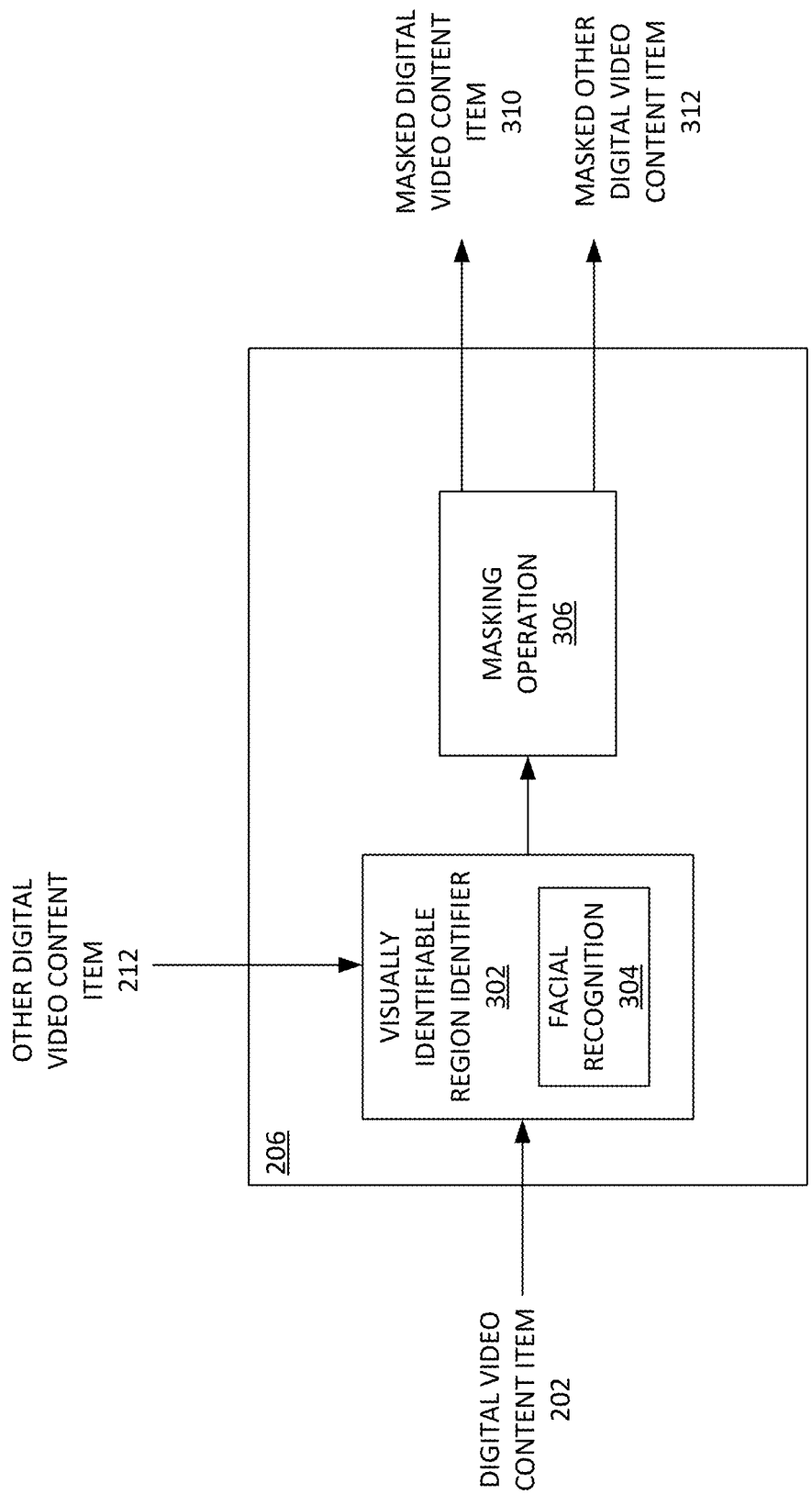

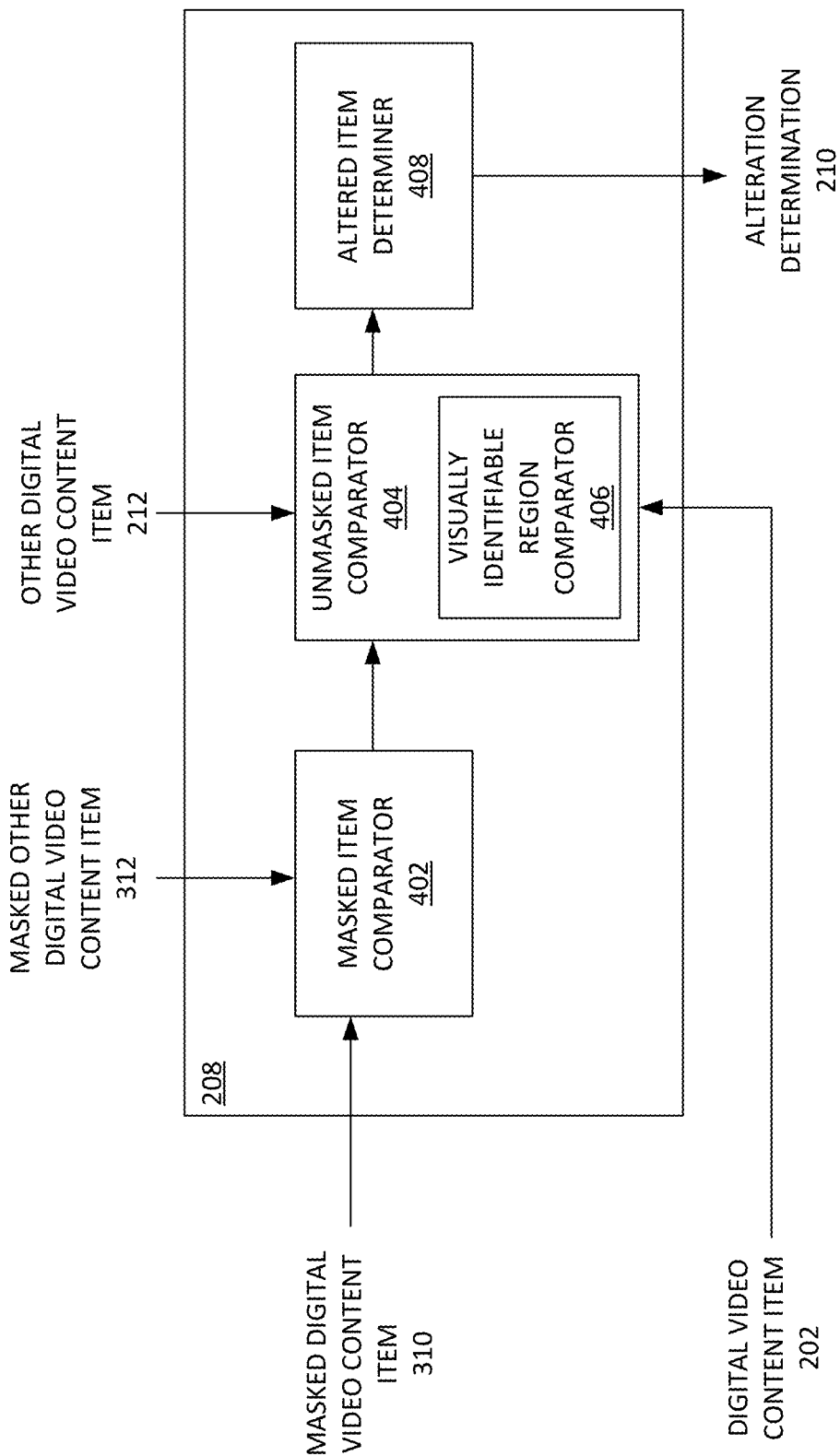

IDENTIFYING ALTERED DIGITAL VIDEO CONTENT

BACKGROUND

The validity and legitimacy of digital content is essential to the proliferation of accurate information. Information is communicated as digital content, such as images and videos, for conveying information. Increasingly, the validity of digital content is under assault as technological advances have enabled skilled users to alter digital content. For instance, videos can be altered to swap faces in videos, replacing the face in the original video with the face of another person. While some alterations of digital video content are obviously for entertainment purposes, there are also instances of nefarious intent behind video digital content alteration. In order to instill confidence in the viewing public, it is important that altered digital video content be identified as such.

BRIEF DESCRIPTION OF DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

FIG. 1B illustrates an example communication network upon which embodiments described herein may be implemented

FIG. 3 is a block diagram illustrating a masking applicator of a system for identifying altered digital video content, in accordance with embodiments.

FIG. 4 is a block diagram illustrating a digital video content item comparator of a system for identifying altered digital video content, in accordance with embodiments.

DESCRIPTION OF EMBODIMENTS

Figure 1A:
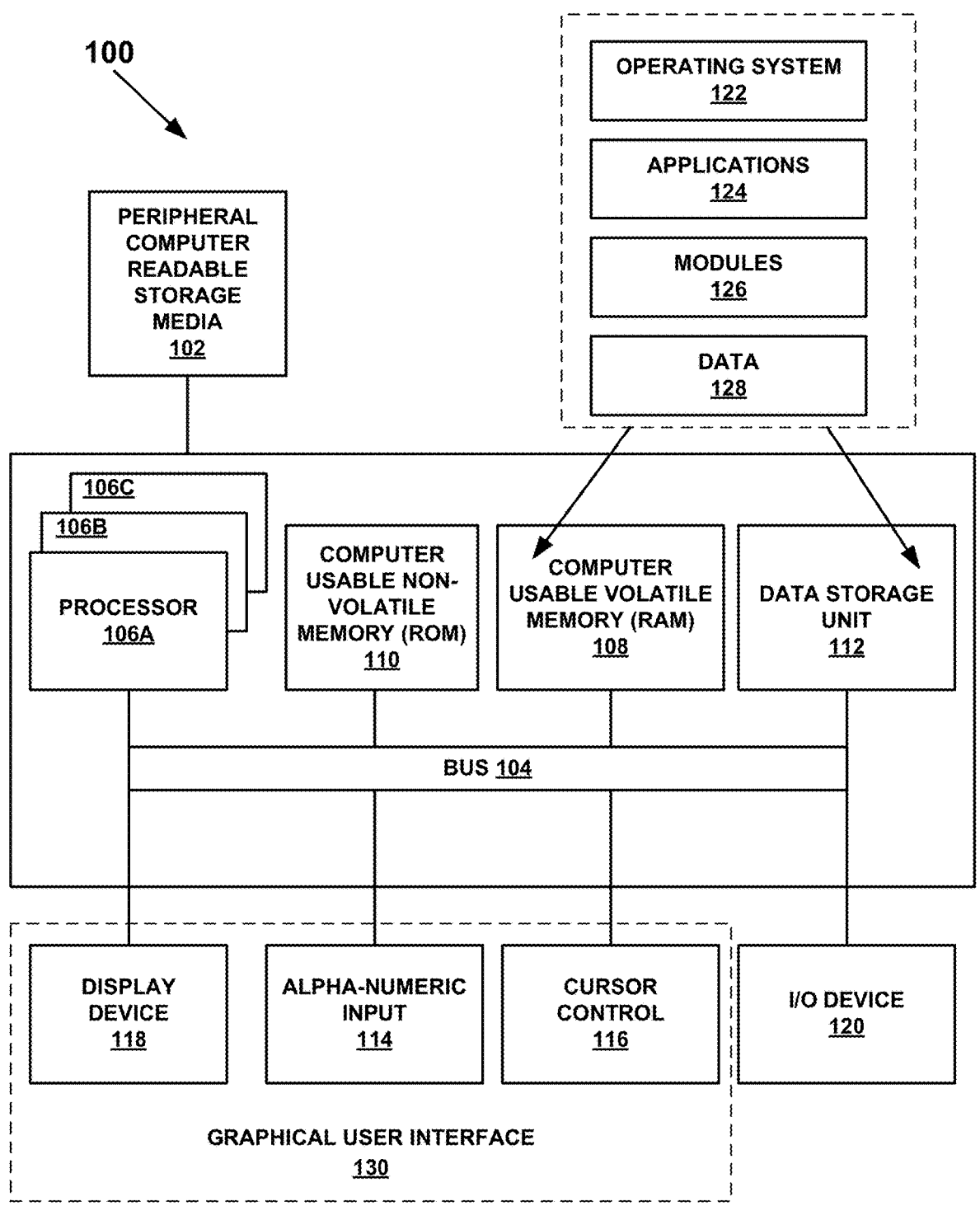
FIG. 1A illustrates an example computer system upon which embodiments described herein be implemented.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Some portions of the detailed descriptions which follow are presented in terms of procedures, logic blocks, processing and other symbolic representations of operations on data within an electrical circuit. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "accessing," "identifying," "applying," "comparing," "determining," "generating," "forwarding," "using," or the like, refer to the actions and processes of an electronic device such as: a processor, a memory, a computing system, a mobile electronic device, or the like, or a combination thereof. The electronic device manipulates and transforms data represented as physical (electronic and/or magnetic) quantities within the electronic device's registers and memories into other data similarly represented as physical quantities within the electronic device's memories or registers or other such information storage, transmission, processing, or display components.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software.

To clearly illustrate this interchangeability of hardware and software, various illustrative components, blocks, modules, logic, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example fingerprint sensing system and/or mobile electronic device described herein may include components other than those shown, including well-known components.

Various techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

Various embodiments described herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), a programmable logic controller (PLC), a complex programmable logic device (CPLD), a discrete gate or transistor logic, discrete hardware components, or any combination thereof designed to perform the functions described herein, or other equivalent integrated or discrete logic circuitry. The term "processor," as used herein may refer to any of the foregoing structures or any other structure suitable for implementation of the techniques described herein. As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Moreover, processors can exploit nano-scale architectures such as, but not limited to, molecular and quantum-dot based transistors, switches and gates, in order to optimize space usage or enhance performance of user equipment. A processor may also be implemented as a combination of computing processing units.

In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Overview of Discussion

Discussion begins with a description of an example computer system upon which embodiments of the present invention may be implemented. Example systems and components for identification of altered digital video content are then described. Example operations of identifying altered digital video content are then described.

In accordance with various embodiments, methods for identifying altered digital video content are provided. A digital video content item is accessed. A visually identifiable region is identified within the digital video content item. A mask is applied to the visually identifiable region of the digital video content item, wherein the mask blocks the visually identifiable region of the digital video content item. The digital video content item with the mask is compared to other digital video content items, wherein the comparing disregards the visually identifiable region according to the mask. Provided the digital video content is identified as similar to at least one other digital video content item, the visually identifiable region of the digital content video item is compared to a visually identifiable region of the at least one other digital video content item. Provided the visually identifiable region of the digital content video item does not match the visually identifiable region of the at least one other digital video content item, it is determined that the digital video content item is altered.

Perceptual hashing, as utilized herein, refers to an algorithm or function that is applied to a media file for generating a fingerprint or signature for the media file where the greater the similarity between two media files, the greater the similarity between the perceptual hashes for the two media files. In some embodiments, the output of a perceptual hashing function is a string or sequence, referred to herein as a perceptual hash. For example, two images that are visually similar to a person will have perceptual hashes that are similar, while two images that are visually much different to a person will have perceptual hashes that are less similar. Perceptual hashing can be contrasted with cryptographic hashing where slight variances in the input drastically change the output. Perceptual hashing is useful in determining whether two images are similar. Example perceptual hash functions include phash and dhash, but other types of perceptual hash functions exist and may be utilized herein, in accordance with the described embodiments. In various embodiments, perceptual hashing is utilized in the context of video files by generating perceptual hashes for frames of the video files.

In accordance with various embodiments described herein, similarity between media files, e.g., images or frames of videos, is determined by comparing perceptual hashes for the media files. An edit distance, also referred to herein as a "distance," between the perceptual hashes is determined. As utilized herein, an edit distance refers to a measure of difference between two sequences or strings. For example, edit distance is a measurement of how dissimilar two strings or sequences are to one another by counting the minimum number of operations required to transform one string into the other. Various types distance determinations may be utilized in accordance with the described embodiments, including and without limitation, the Levenshtein distance, the Hamming distance, the Damerau-Levenshtein distance, and the longest common sequence (LCS).

Embodiments described herein pertain to identification of altered video content items. In one embodiment, the video content item is a Graphics Interchange Format (GIF) file. While embodiments described herein pertain to GIF files, it should be appreciated that other types of prerecorded media files, such as other types of video files, can be used herein. Moreover, it should be appreciated that any type of media file format can be used in accordance with the described embodiments, including but not limited to GIF, WebM, WebP, MPEG-4 (MP4), Animated Portable Network Graphics (APNG), Motion JPEG, Flash video (FLV), Windows Media video, M4V, etc. It should be appreciated that video content item can be looped (e.g., via a HTML 5 video element or Flash video element) to automatically repeat. In some embodiments, the video content item is a short form looping video file (e.g., less than 60 seconds).

Embodiments described herein pertain to automating identification and detection of altered video content, such as images and moving videos. The validity and legitimacy of digital content is essential to the proliferation of accurate information. In order to encourage the dissemination of digital content, embodiments described herein validate the authenticity of digital content by determining whether a digital content item is altered relative to an original video content item. The described embodiments improve the technology of digital content dissemination by identifying altered digital content by allowing for the flagging of digital content as altered or for removal of the digital content from dissemination.

In accordance with various embodiments, a visually identifiable region within a digital video content item is automatically identified. In one embodiment, the visually identifiable region includes a face (e.g., facial region) of the digital video content item. In some embodiments, the facial region is automatically identified using facial recognition. In other embodiments, the visually identifiable region includes an object, a logo, etc.

A mask is applied to the visually identifiable region of the digital video content item, where the mask blocks the visually identifiable region of the digital video content item. In various embodiments, the mask indicates the region of the digital video content that is ignored during comparison to other digital video content items. In other words, the visually identifiable region of the digital video content item is disregarded, while all other content of the digital video content item (e.g., body, foreground, background, etc.) is used to determine whether the digital video content item is similar to another digital video content item.

The digital video content item with the mask is compared to other digital video content items. In some embodiments, the other digital video content items are comprised within a library of digital video content items. In some embodiments, the other digital video content items are accessible for search, e.g., available over the Internet. It should be appreciated that any repository or location including digital video content items can be utilized in the described embodiments. In some embodiments, the digital video content items are associated with pre-generated perceptual hashes, e.g., in a digital video content library.

In some embodiments, a plurality of perceptual hashes for frames of the digital video content item are generated. The plurality of perceptual hashes for the digital video content item is then compared to perceptual hashes for other digital video content items. In some embodiments, distances between the perceptual hashes for frames of the digital video content item and the perceptual hashes for frames of the other digital video content items are determined. Provided at least a portion of the distances satisfy a distance threshold between the digital video content item and one other digital video content item, the digital video content item is identified as similar to the one other digital video content item. It should be appreciated that similarity between perceptual hashes can be determined in other ways, such as making a probabilistic determination, e.g., that the decision regarding the similarity has a certain level of confidence. The decision regarding similarity between digital video content items can be made on that probability.

Responsive to identifying another digital video content item as being similar to the digital video content item, the visually identifiable region of the digital content video item is compared to the visually identifiable region of the at least one other digital video content item. For example, if two digital video content items are determined to be similar (e.g., satisfy a distance threshold), the facial regions are compared. In one embodiment, a plurality of perceptual hashes corresponding to the visually identifiable region for frames of the digital video content item are generated. The plurality of perceptual hashes corresponding to the visually identifiable region for frames of the digital video content item are compared to perceptual hashes corresponding to the visually identifiable region for frames of the a least one other digital video content items. In one embodiment, the plurality of perceptual hashes for the visually identifiable region for frames of the at least one other digital video content item is generated. In other embodiments, perceptual hashes for the entire frames (including the visually identifiable region) of the digital video content items are generated and compared. If the distances do not satisfy a visually identifiable region distance threshold between the digital video content item and one other digital video content item, it is determined that the visually identifiable regions do not match and that the digital video content item is altered. It should be appreciated that similarity between perceptual hashes can be determined in other ways, such as making a probabilistic determination, e.g., that the decision regarding the similarity has a certain level of confidence. The decision regarding matching of visually identifiable regions can be made on that probability.

In some embodiments, responsive to determining that the digital video content item is altered, the digital video content item is forwarded to a human operator for visual confirmation that the digital video content item is altered. In some embodiments, responsive to receiving a confirmation from the human operator that the digital video content item is altered, the digital video content item is used for training automated alteration analysis of digital video content.

As presented above, identification of altered digital content, e.g., video content, is important for facilitating the use of digital content. Providing automated analysis of digital content items for determination as to whether the digital content items have been altered, and thus are not accurate representations of the content expressed within the digital content items, improves the quality and perception of digital content items. Hence, the embodiments of the present invention greatly extend beyond conventional methods of identification of altered digital content. Moreover, embodiments of the present invention amount to significantly more than merely using a computer to perform identification of altered digital content. Instead, embodiments of the present invention specifically recite a novel process, rooted in computer technology, utilizing masking of visually identifiable regions of digital video content items to compare to other digital video content items for determining similarity, and, responsive to identifying similar digital video content items, comparing the visually identifiable regions for determining whether the digital video content item has been altered.

Example Computer System and Communication Network

Turning now to the figures, FIG. 1A is a block diagram of an example computer system 100 upon which embodiments of the present invention can be implemented. FIG. 1A illustrates one example of a type of computer system 100 (e.g., a computer system) that can be used in accordance with or to implement various embodiments which are discussed herein.

It is appreciated that computer system 100 of FIG. 1A is only an example and that embodiments as described herein can operate on or within a number of different computer systems including, but not limited to, general purpose networked computer systems, embedded computer systems, mobile electronic devices, smart phones, server devices, client devices, various intermediate devices/nodes, stand alone computer systems, media centers, handheld computer systems, multi-media devices, and the like. In some embodiments, computer system 100 of FIG. 1A is well adapted to having peripheral tangible computer-readable storage media 102 such as, for example, an electronic flash memory data storage device, a floppy disc, a compact disc, digital versatile disc, other disc based storage, universal serial bus "thumb" drive, removable memory card, and the like coupled thereto. The tangible computer-readable storage media is non-transitory in nature.

Computer system 100 of FIG. 1A includes an address/data bus 104 for communicating information, and a processor 106A coupled with bus 104 for processing information and instructions. As depicted in FIG. 1A, computer system 100 is also well suited to a multi-processor environment in which a plurality of processors 106A, 106B, and 106C are present. Conversely, computer system 100 is also well suited to having a single processor such as, for example, processor 106A. Processors 106A, 106B, and 106C may be any of various types of microprocessors. Computer system 100 also includes data storage features such as a computer usable volatile memory 108, e.g., random access memory (RAM), coupled with bus 104 for storing information and instructions for processors 106A, 106B, and 106C. Computer system 100 also includes computer usable non-volatile memory 110, e.g., read only memory (ROM), coupled with bus 104 for storing static information and instructions for processors 106A, 106B, and 106C. Also present in computer system 100 is a data storage unit 112 (e.g., a magnetic or optical disc and disc drive) coupled with bus 104 for storing information and instructions. Computer system 100 also includes an alphanumeric input device 114 including alphanumeric and function keys coupled with bus 104 for communicating information and command selections to processor 106A or processors 106A, 1066, and 106C. Computer system 100 also includes an cursor control device 116 coupled with bus 104 for communicating user input information and command selections to processor 106A or processors 106A, 106B, and 106C. In one embodiment, computer system 100 also includes a display device 118 coupled with bus 104 for displaying information.

Referring still to FIG. 1A, display device 118 of FIG. 1A may be a liquid crystal device (LCD), light emitting diode display (LED) device, cathode ray tube (CRT), plasma display device, a touch screen device, or other display device suitable for creating graphic images and alphanumeric characters recognizable to a user. Cursor control device 116 allows the computer user to dynamically signal the movement of a visible symbol (cursor) on a display screen of display device 118 and indicate user selections of selectable items displayed on display device 118. Many implementations of cursor control device 116 are known in the art including a trackball, mouse, touch pad, touch screen, joystick or special keys on alphanumeric input device 114 capable of signaling movement of a given direction or manner of displacement. Alternatively, it will be appreciated that a cursor can be directed and/or activated via input from alphanumeric input device 114 using special keys and key sequence commands. Computer system 100 is also well suited to having a cursor directed by other means such as, for example, voice commands. In various embodiments, alphanumeric input device 114, cursor control device 116, and display device 118, or any combination thereof (e.g., user interface selection devices), may collectively operate to provide a graphical user interface (GUI) 130 under the direction of a processor (e.g., processor 106A or processors 106A, 106B, and 106C). GUI 130 allows user to interact with computer system 100 through graphical representations presented on display device 118 by interacting with alphanumeric input device 114 and/or cursor control device 116.

Computer system 100 also includes an I/O device 120 for coupling computer system 100 with external entities. For example, in one embodiment, I/O device 120 is a modem for enabling wired or wireless communications between computer system 100 and an external network such as, but not limited to, the Internet. In one embodiment, I/O device 120 includes a transmitter. Computer system 100 may communicate with a network by transmitting data via I/O device 120.

Referring still to FIG. 1A, various other components are depicted for computer system 100. Specifically, when present, an operating system 122, applications 124, modules 126, and data 128 are shown as typically residing in one or some combination of computer usable volatile memory 108 (e.g., RAM), computer usable non-volatile memory 110 (e.g., ROM), and data storage unit 112. In some embodiments, all or portions of various embodiments described herein are stored, for example, as an application 124 and/or module 126 in memory locations within RAM 108, computer-readable storage media within data storage unit 112, peripheral computer-readable storage media 102, and/or other tangible computer-readable storage media.

FIG. 1B illustrates an example communication network 150 upon which embodiments described herein may be implemented. FIG. 1B illustrates computer system 100, media file library 152, and digital video content item 154, all of which are communicatively coupled via network 150. It should be appreciated that computer system 100, media file library 152, and digital video content item 154, may be implemented as a computer system 100 or as another computer system.

In one embodiment, media file library 152 is a server computer system including a plurality of digital video content items. A media file can be any type of file that can be rendered on an electronic device (e.g., a prerecorded video file). It should be appreciated that any type of media file format can be used in accordance with the described embodiments, including but not limited to Graphics Interchange Format (GIF), WebM, WebP, MPEG-4 (MP4), Animated Portable Network Graphics (APNG), Motion JPEG, Flash video (FLV), Windows Media video, M4V, etc.

Example System for Identification of Altered Digital Video Content

Figure 2:
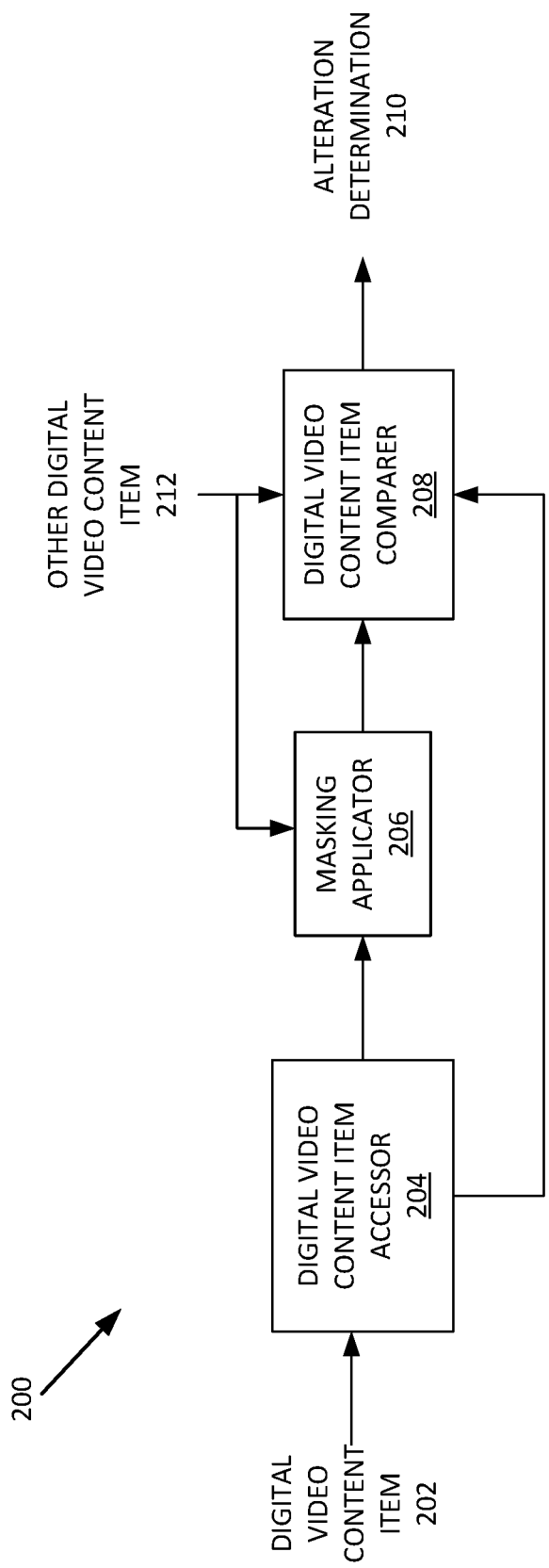
FIG. 2 is a block diagram illustrating a system for identifying altered digital video content, in accordance with embodiments.

FIG. 2 is a block diagram illustrating a system 200 for identifying altered digital video content, in accordance with embodiments. System 200 is configured to perform a novel process of identifying altered digital video content which is necessarily rooted in computer technology to overcome a problem specifically arising in the realm of the analysis of digital video content items for rendering on computer systems. In one embodiment, system 200 provides an alteration determination 210 for digital video content item 202. System 200 includes digital video content item accessor 204, masking applicator 206, and digital video content item comparer 208. System 200 can be implemented by a digital content distributor, e.g., a server, to access a digital video content item at digital video content item accessor 204, to identifying a visually identifiable region of the digital video content item and applying a mask to the digital video content item at masking applicator 206, and comparing the digital video content item to other digital video content items at digital video content item comparer 208 to determine whether the digital video content item has been altered.

In the example shown in FIG. 2, a digital video content item 202 is accessed at digital video content item accessor 204. In one embodiment, digital video content item 202 is provided by a user via a client computer system. In one embodiment, digital video content item 202 is received responsive to digital video content item 202 being uploaded or added to a content distribution system. In some embodiments, digital video content item 202 is received from a media file library 152. It should be appreciated that digital video content item 202 can be accessed or received using different methods and responsive to different conditions.

In some embodiments, digital video content item 202 is a GIF file. While embodiments described herein pertain to GIF files, it should be appreciated that other types of prerecorded media files, such as other types of video files, can be used herein. Moreover, it should be appreciated that any type of media file format can be used in accordance with the described embodiments, including but not limited to GIF, WebM, WebP, MPEG-4 (MP4), APNG, Motion JPEG, Flash video (FLV), Windows Media video, M4V, etc. It should be appreciated that video content item can be looped (e.g., via a HTML 5 video element or Flash video element) to automatically repeat. In some embodiments, the digital video content item is a short form looping video file (e.g., less than 60 seconds).

With reference to FIG. 2, digital video content item accessor 204 accesses digital video content item 202, masking applicator 206 handles identifying a visually identifiable region (e.g., facial region) of the digital video content item and applying a mask to the digital video content item, and digital video content item comparer 208 determines whether the digital video content item has been altered. Although shown as separate components in FIG. 2, digital video content item accessor 204, masking applicator 206, and digital video content item comparer 208 can be implemented as a single component or as any other combination of components for performing the described functionality.

FIG. 3 is a block diagram illustrating a masking applicator 206 of a system 200 for identifying altered digital video content, in accordance with embodiments. In one embodiment, masking applicator 206 receives a digital video content item 202. Masking applicator 206 is configured to identify a visually identifiable region within the digital video content item at visually identifiable region identifier 302. In one embodiment, the visually identifiable region includes a face (e.g., a facial region). In one embodiment, facial recognition 304 is operable to perform the facial recognition for identifying the visually identifiable region. It should be appreciated that the visually identifiable region can include other content that could be subject to faking or spoofing by users, such as products, logos, etc. For instance, the visually identifiable region may include other content, including but not limited to an object, a logo, etc.

A mask is applied to the visually identifiable region of digital video content item 202, where the mask blocks the visually identifiable region of the digital video content item. In various embodiments, the mask indicates the region of the digital video content that is ignored during comparison to other digital video content items. In other words, the visually identifiable region of digital video content item 202 is disregarded, while all other content of digital video content item 202 (e.g., body, foreground, background, etc.) is used to determine whether digital video content item 202 is similar to other digital video content item 212. In some embodiments, other digital video content item 212 is comprised within a library of digital video content items (e.g., media file library 152). In some embodiments, other digital video content item 212 is accessible for search, e.g., available over the Internet. It should be appreciated that any repository or location including digital video content items can be utilized in the described embodiments. In some embodiments, the digital video content items are associated with pre-generated perceptual hashes, e.g., in media file library 152.

Masking operation 306 is configured to apply a mask to the visually identifiable region of the digital video content item 202, wherein the mask blocks the visually identifiable region of the digital video content item 202. For example, with reference to FIG. 5A, a frame 500 of a digital video content item is shown. Mask 502 is illustrated as blocking the visually identifiable region (e.g., a facial region) of frame 500. It should be appreciated that blocking of the visually identifiable region refers to disregarding the visually identifiable region of the digital video content item and is not limited to blocking a visual representation of the visually identifiable region. In some embodiments, the mask (e.g., mask 502) is not presented to a user. Rather, the mask is used as an instruction to digital video content item comparator 208 to disregard the region of digital video content item 202 during a comparison to another digital video content item. Masking operation 306 generates masked digital video content item 310.

In some embodiments, masking applicator 206 also receives other digital video content item 212. By performing the masking operation on other digital video content item 212, the comparison can be performed on the unmasked regions of digital video content item 202 and other digital video content item 212. Visually identifiable region identifier 302 operates to identify a visually identifiable region of other digital video content item 212. In one embodiment, the visually identifiable region includes a face (e.g., a facial region). In one embodiment, facial recognition 304 is operable to perform the facial recognition for identifying the visually identifiable region. It should be appreciated that visually identifiable region identifier 302 operates on other digital video content item 212 in the same manner as digital video content item 202. Masking operation 306 generates masked other digital video content item 312.

FIG. 4 is a block diagram illustrating a digital video content item comparator 208 of a system 200 for identifying altered digital video content, in accordance with embodiments. Masked digital video content item 310 is compared to masked other digital video content item 312. In one embodiment, digital video content item comparator 208 receives masked digital video content item 310. In one embodiment, digital video content item comparator 208 also receives masked other digital video content item 312. Digital video content item comparator 208 is configured to compare masked digital video content item 310 with masked other digital video content item 312, wherein the comparing disregards the visually identifiable region according to the masks. In other embodiments, digital video content item comparator 208 is configured to compare masked digital video content item 310 with other digital video content item 212, wherein the comparing disregards the visually identifiable region according to the mask of masked digital video content item 310.

In one embodiment, masked item comparator 402 receives masked digital video content item 310 and masked other digital video content item 312. Masked item comparator 402 is configured to generate perceptual hashes for frames of masked digital video content item 310. Perceptual hashing, as utilized herein, refers to an algorithm or function that is applied to a media file for generating a fingerprint or signature for the media file where the greater the similarity between two media files, the greater the similarity between the perceptual hashes for the two media files. In some embodiments, the output of a perceptual hashing function is a string or sequence, referred to herein as a perceptual hash. For example, two images that are visually similar to a person will have perceptual hashes that are similar, while two images that are visually much different to a person will have perceptual hashes that are less similar. Perceptual hashing can be contrasted with cryptographic hashing where slight variances in the input drastically change the output. Perceptual hashing is useful in determining whether two images are similar. Example perceptual hash functions include phash and dhash, but other types of perceptual hash functions exist and may be utilized herein, in accordance with the described embodiments. In various embodiments, perceptual hashing is utilized in the context of video files by generating perceptual hashes for frames of the video files.

In accordance with various embodiments described herein, similarity between media files, e.g., images or frames of videos, is determined by comparing perceptual hashes for the media files. An edit distance, also referred to herein as a "distance," between the perceptual hashes is determined. As utilized herein, an edit distance refers to a measure of difference between two sequences or strings. For example, edit distance is a measurement of how dissimilar two strings or sequences are to one another by counting the minimum number of operations required to transform one string into the other. Various types distance determinations may be utilized in accordance with the described embodiments, including and without limitation, the Levenshtein distance, the Hamming distance, the Damerau-Levenshtein distance, and the longest common sequence (LCS).

The plurality of perceptual hashes for masked digital video content item 310 is then compared to perceptual hashes for masked other digital video content item 312. In some embodiments, distances between the perceptual hashes for frames of masked digital video content item 310 and the perceptual hashes for frames of masked other digital video content item 312 are determined. In one embodiment, provided at least a portion of the distances satisfy a distance threshold between masked digital video content item 310 and masked other digital video content item 312, digital video content item 202 is identified as similar to the other digital video content item 212. For instance, the comparison between masked digital video content item 310 and masked other digital video content item 312 determines whether the unmasked regions of masked digital video content item 310 and masked other digital video content item 312 are similar, e.g., satisfy a distance threshold. In accordance with other embodiments, it should be appreciated that similarity between perceptual hashes can be determined in other ways, such as making a probabilistic determination, e.g., that the decision regarding the similarity has a certain level of confidence. The decision regarding similarity between digital video content items can be made on that probability.

Figure 5A:
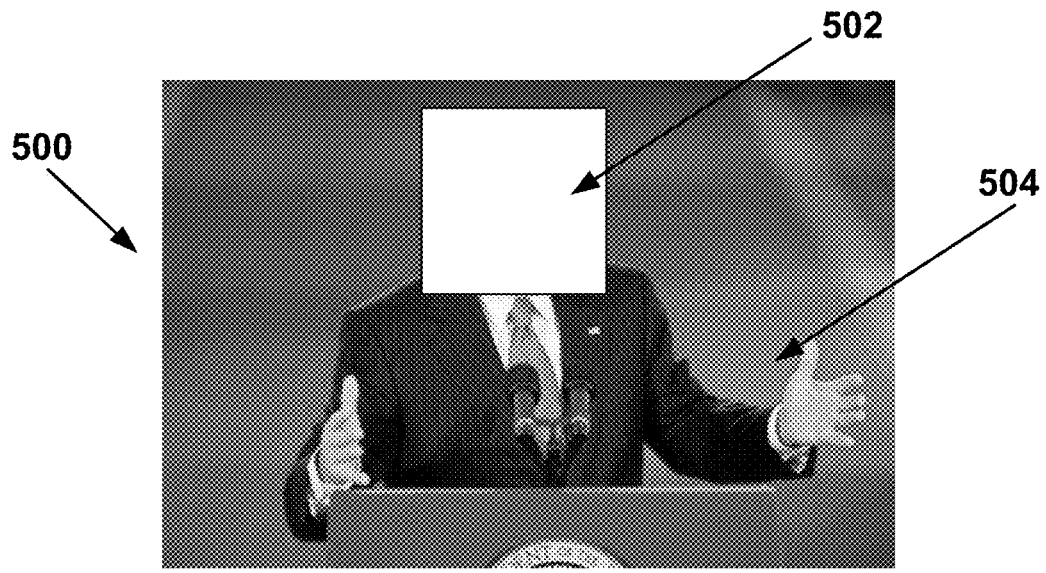
FIGS. 5A and 5B illustrate examples of frames of digital video content items including masks over visually identifiable regions of the digital video content items, according to some embodiments.
Figure 5B:
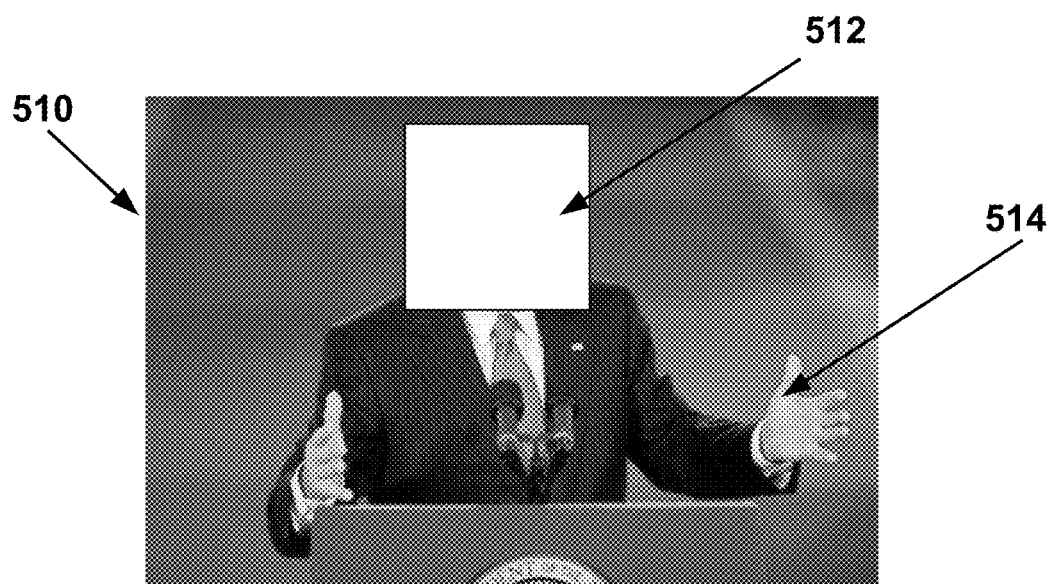

With reference to FIGS. 5A and 5B, examples of frames of digital video content items including masks over visually identifiable regions of the digital video content items are illustrated, according to some embodiments. As illustrated in FIG. 5A, a frame 500 of an other digital video content item is shown. Mask 502 is illustrated as blocking the visually identifiable region (e.g., a facial region) of frame 500 and region 504 is the unmasked region used for comparison. FIG. 5B illustrates a frame 510 of a digital video content item, with mask 512 blocking the visually identifiable region (e.g., a facial region) of frame 510 and region 514 is the unmasked region used for comparison. Region 504 of frame 500 and region 514 of frame 510 are compared to determine whether they are similar. In some embodiments, the source and validity of frame 510 is known and is compared against frame 500 for determining with the digital video content item including frame 510 has been altered.

For example, where frames 500 and 510 of different digital video content items are sourced from the same item, the difference in edit distance of perceptual hashes between regions 504 and 514 is small. For each comparison, an edit distance is determined, for example using the Hamming distance or Levenshtein distance. A distance threshold can be used to determine whether the difference is small enough to determine that the digital video content items are similar. It should be appreciated that this comparison can be performed for a plurality of frames of the digital video content items. It should further be appreciated that frames need not be identical to determine that they are from the same source digital video content item. For instance, transcoding operations may cause a misalignment between frames of the digital video content items, resulting in minor differences in edit distances for frames at the same or similar time sequence in the digital video content items. The distance threshold can be established to allow for the differences in edit distance in perceptual hashes. In accordance with other embodiments, it should be appreciated that similarity between perceptual hashes can be determined in other ways, such as making a probabilistic determination, e.g., that the decision regarding the similarity has a certain level of confidence. The decision regarding similarity between digital video content items can be made on that probability.

With reference to FIG. 4, responsive to identifying that masked digital video content item 310 is similar to masked other digital video content item 312, the visually identifiable region of digital video content item 202 is compared to the visually identifiable region of other digital video content item 212. For example, if two digital video content items are determined to be similar (e.g., satisfy a distance threshold), the facial regions are compared. In one embodiment, the visually identifiable regions are compared. In another embodiment, the entire digital video content items including the unmasked regions and the visually identifiable regions are compared.

Unmasked item comparator 404 receives digital video content item 202 and other digital video content item 212. In one embodiment, a plurality of perceptual hashes corresponding to the frames of digital video content item 202. In one embodiment, the plurality of perceptual hashes for frames of the other digital video content item 212 is generated. In other embodiments, perceptual hashes for the entire frames (including the visually identifiable region) of digital video content item 202 and other digital video content item 212 are generated. In other embodiments, a plurality of perceptual hashes corresponding to the visually identifiable regions for frames of digital video content item 202 and other digital video content item 212 are generated. At visually identifiable region comparator 406, the perceptual hashes are compared. In one embodiment, the edit distances are determined.

Altered item determiner 408 receives the edit distances between the perceptual hashes. If the edit distances do not satisfy a visually identifiable region distance threshold between digital video content item 202 and other digital video content item 212, it is determined that the visually identifiable regions do not match and that digital video content item 202 item is altered. In accordance with other embodiments, it should be appreciated that similarity between perceptual hashes can be determined in other ways, such as making a probabilistic determination, e.g., that the decision regarding the similarity has a certain level of confidence. The decision regarding matching of visually identifiable regions can be made on that probability.

In some embodiments, responsive to determining that digital video content item 202 item is altered, digital video content item 202 is forwarded to a human operator for visual confirmation that digital video content item 202 is altered. In some embodiments, responsive to receiving a confirmation from the human operator that digital video content item 202 is altered, digital video content item 202 is used for training automated alteration analysis of digital video content.

As presented above, identification of altered digital content, e.g., video content, is important for facilitating the use of digital content. Providing automated analysis of digital content items for determination as to whether the digital content items have been altered, and thus are not accurate representations of the content expressed within the digital content items, improves the quality and perception of digital content items. Hence, the embodiments of the present invention greatly extend beyond conventional methods of identification of altered digital content. Moreover, embodiments of the present invention amount to significantly more than merely using a computer to perform identification of altered digital content. Instead, embodiments of the present invention specifically recite a novel process, rooted in computer technology, utilizing masking of visually identifiable regions of digital video content items to compare to other digital video content items for determining similarity, and, responsive to identifying similar digital video content items, comparing the visually identifiable regions for determining whether the digital video content item has been altered.

Example Operations of Identifying Altered Digital Video Content

The following discussion sets forth in detail the operation of some example methods of operation of embodiments. With reference to FIGS. 6 through 9, flow diagrams 600, 700, and 800 illustrate example procedures used by various embodiments. The flow diagrams 600, 700, and 800 include some procedures that, in various embodiments, are carried out by a processor under the control of computer-readable and computer-executable instructions. In this fashion, procedures described herein and in conjunction with the flow diagrams are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environments (e.g., computer system 100). The computer-readable and computer-executable instructions, which reside on tangible computer readable storage media, are used to control or operate in conjunction with, for example, one or some combination of processors of the computer environments and/or virtualized environment. It is appreciated that the processor(s) may be physical or virtual or some combination (it should also be appreciated that a virtual processor is implemented on physical hardware). Although specific procedures are disclosed in the flow diagram, such procedures are examples. That is, embodiments are well suited to performing various other procedures or variations of the procedures recited in the flow diagram. Likewise, in some embodiments, the procedures in flow diagrams 600, 700, and 800 may be performed in an order different than presented and/or not all of the procedures described in flow diagrams 600, 700, and 800 may be performed. It is further appreciated that procedures described in flow diagrams 600, 700, and 800 may be implemented in hardware, or a combination of hardware with firmware and/or software provided by computer system 100.

Figure 6:
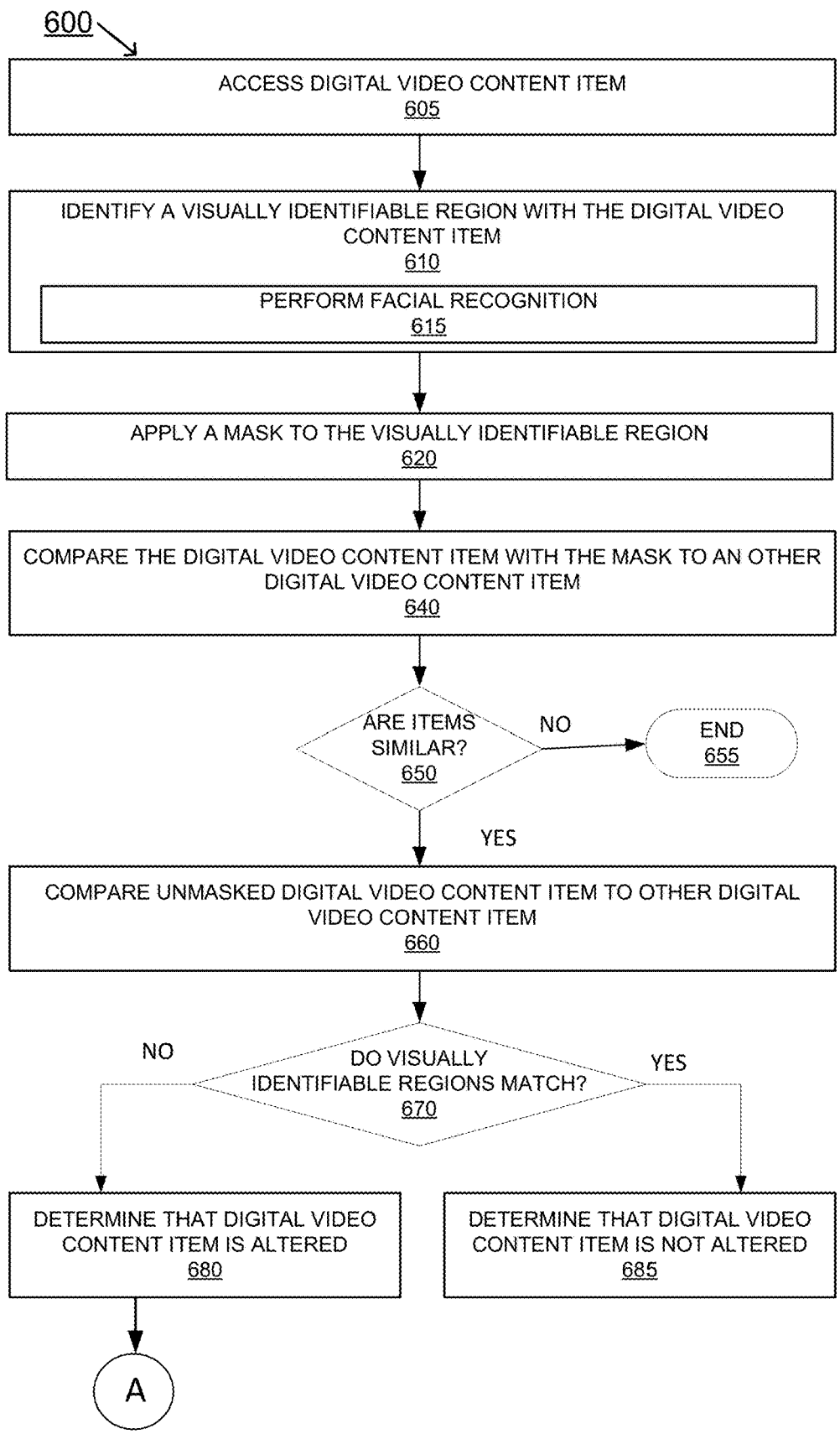
FIG. 6 illustrates a flow diagram of an example method for identifying an altered video content item, according to various embodiments.

FIG. 6 illustrates a flow diagram 600 of an example method for identifying an altered video content item, according to various embodiments. At procedure 605, a digital video content item is accessed. At procedure 610, a visually identifiable region is identified within the digital video content item. In one embodiment, as show at procedure 615, the visually identifiable region is identified by performing facial recognition. At procedure 620, a mask is applied to the visually identifiable region of the digital video content item, wherein the mask blocks the visually identifiable region of the digital video content item.

At procedure 640, the digital video content item with the mask is compared to other digital video content items, wherein the comparing disregards the visually identifiable region according to the mask. In one embodiment, procedure 640 is performed according to flow diagram 700 of FIG. 7.

Figure 7:
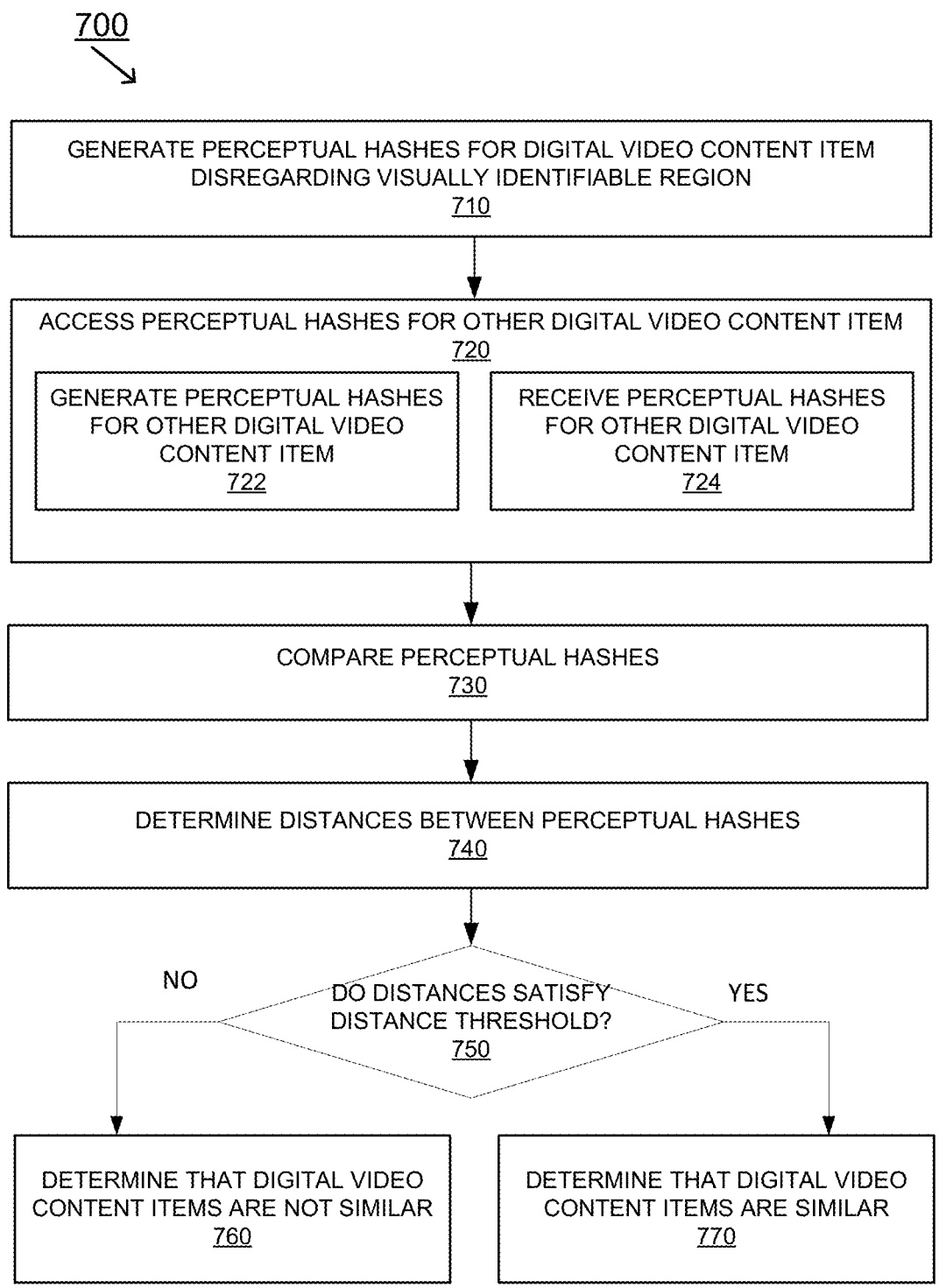
FIG. 7 illustrates a flow diagram of an example method for determining whether digital video content items are similar, according to various embodiments.

FIG. 7 illustrates a flow diagram 700 of an example method for determining whether digital video content items are similar, according to various embodiments. At procedure 710, a plurality of perceptual hashes for frames of the digital video content item are generated. At procedure 720, a plurality of perceptual hashes for frames of the other digital video content item are accessed. In one embodiment, as shown at procedure 722, the plurality of perceptual hashes for frames of the other digital video content item are generated. In one embodiment, as shown at procedure 724, the plurality of perceptual hashes for frames of the other digital video content item are received.

At procedure 730, the plurality of perceptual hashes for the digital video content item are compared to perceptual hashes for other digital video content items. In some embodiments, as shown at procedure 740, distances between the perceptual hashes for frames of the digital video content item and the perceptual hashes for frames of the other digital video content items are determined. At procedure 750, it is determined whether the distances satisfy a distance threshold. Provided at least a portion of the distances do not satisfy a distance threshold between the digital video content item and one other digital video content item, as shown at procedure 760, the digital video content item is identified as similar to the one other digital video content item. Provided at least a portion of the distances satisfy a distance threshold between the digital video content item and one other digital video content item, as shown at procedure 770, the digital video content item is identified as similar to the one other digital video content item. In accordance with other embodiments, it should be appreciated that similarity between perceptual hashes can be determined in other ways, such as making a probabilistic determination, e.g., that the decision regarding the similarity has a certain level of confidence. The decision regarding similarity between digital video content items can be made on that probability.

With reference to FIG. 6, at procedure 650, it is determined whether the digital video content item and the other digital video content item are similar. In some embodiments, the similarity determination is based on a comparison of perceptual hashes to a threshold. In some embodiments, it should be appreciated that similarity between perceptual hashes can be determined in other ways, such as making a probabilistic determination, e.g., that the decision regarding the similarity has a certain level of confidence. The decision regarding similarity between digital video content items can be made on that probability. If the digital video content item is not similar to the other digital video content item, as shown in procedure 655, flow diagram 600 ends. If the digital video content item is identified as similar to the other digital video content item, flow diagram 600 proceeds to procedure 660. At procedure 660, the visually identifiable region of the digital content video item is compared to a visually identifiable region of the at least one other digital video content item. In one embodiment, procedure 660 is performed according to flow diagram 800 of FIG. 8.

Figure 8:
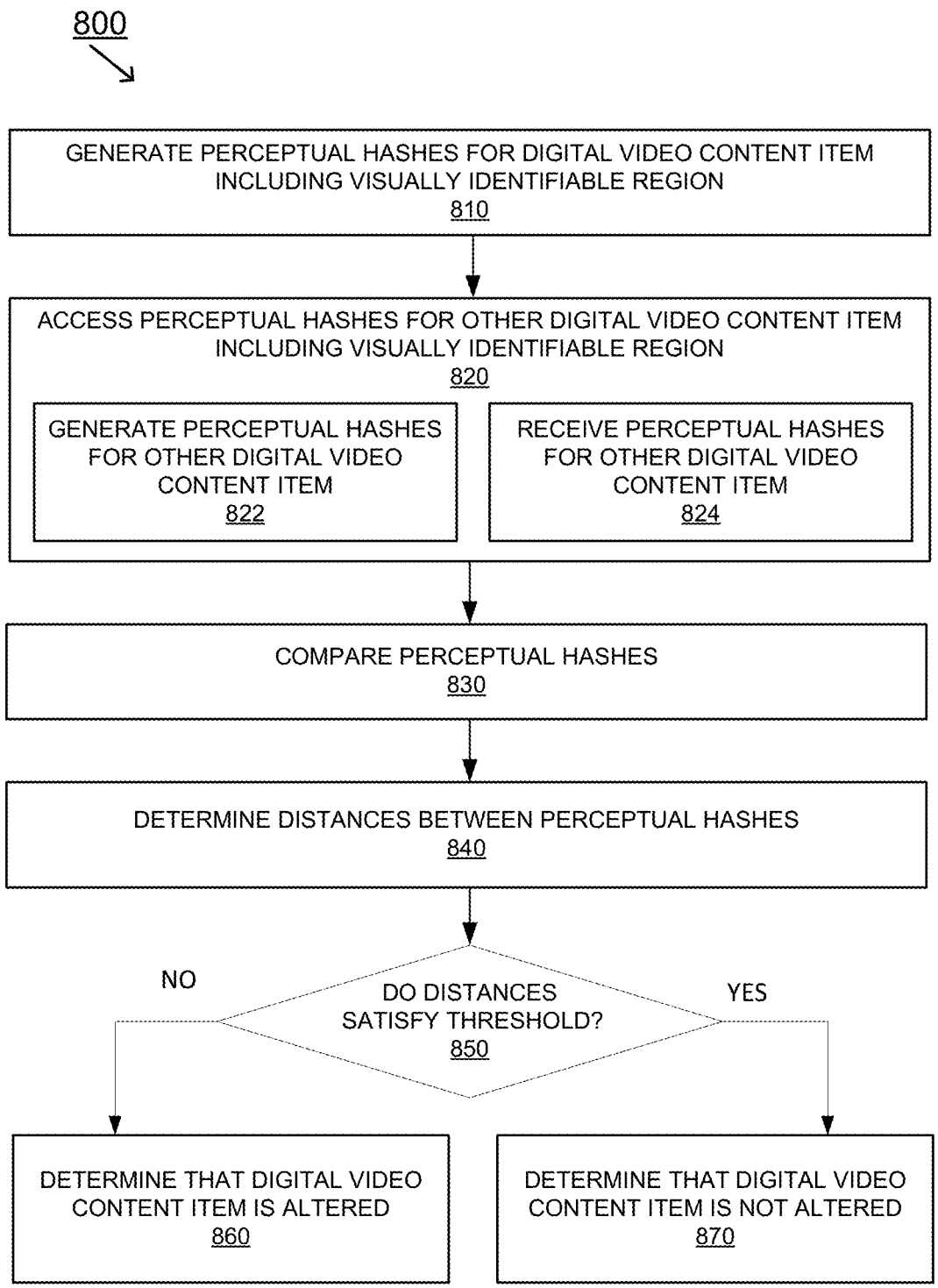
FIG. 8 illustrates a flow diagram of an example method for determining whether visually identifiable regions of similar digital video content items match, according to various embodiments.

FIG. 8 illustrates a flow diagram 800 of an example method for determining whether visually identifiable regions of similar digital video content items match, according to various embodiments. At procedure 810, a plurality of perceptual hashes corresponding to the visually identifiable region for frames of the digital video content item are generated. At procedure 820, a plurality of perceptual hashes corresponding to the visually identifiable region for frames of the other digital video content item are accessed. In one embodiment, as shown at procedure 822, the plurality of perceptual hashes corresponding to the visually identifiable region for frames of the other digital video content item are generated. In one embodiment, as shown at procedure 824, the plurality of perceptual hashes corresponding to the visually identifiable region for frames of the other digital video content item are received. In other embodiments, perceptual hashes for the entire frames (including the visually identifiable region) of the digital video content items are generated.

At procedure 830, the plurality of perceptual hashes corresponding to the visually identifiable region for frames of the digital video content item are compared to perceptual hashes corresponding to the visually identifiable region for frames of the a least one other digital video content items. In some embodiments, as shown at procedure 840, distances between the perceptual hashes for frames of the digital video content item and the perceptual hashes corresponding to the visually identifiable region for frames of the other digital video content items are determined. At procedure 850, it is determined whether the distances satisfy a distance threshold. Provided at least a portion of the distances do not satisfy a visually identifiable region threshold between the digital video content item and one other digital video content item, as shown at procedure 860, it is determined that the digital video content item is altered. Provided the distances do satisfy a visually identifiable region threshold between the digital video content item and one other digital video content item, as shown at procedure 870, it is determined that the digital video content item is not altered. In accordance with other embodiments, it should be appreciated that similarity between perceptual hashes can be determined in other ways, such as making a probabilistic determination, e.g., that the decision regarding the similarity has a certain level of confidence. The decision regarding matching of visually identifiable regions can be made on that probability.

With reference to FIG. 6, at procedure 670, it is determined whether the visually identifiable region of the digital video content item and the visually identifiable region of the other digital video content item match. In some embodiments, the matching determination is based on a comparison of perceptual hashes to a threshold. In some embodiments, it should be appreciated that similarity between perceptual hashes can be determined in other ways, such as making a probabilistic determination, e.g., that the decision regarding the similarity has a certain level of confidence. The decision regarding matching of visually identifiable regions can be made on that probability.

If the visually identifiable region of the digital content video item does not match the visually identifiable region of the at least one other digital video content item, as shown at procedure 680, it is determined that the digital video content item is altered. If the visually identifiable region of the digital content video item does match the visually identifiable region of the at least one other digital video content item, as shown at procedure 685, it is determined that the digital video content item is not altered.

Figure 9:
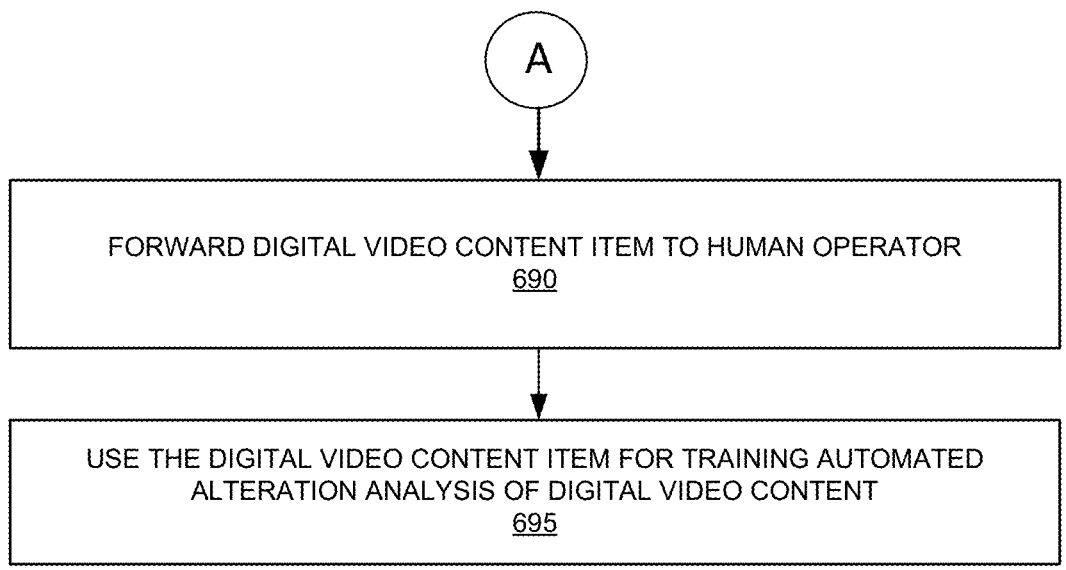
FIG. 9 illustrates a flow diagram of additional procedures of an example method for identifying an altered video content item, according to various embodiments.

FIG. 9 illustrates a continuation of flow diagram 600 illustrating additional procedures of an example method for identifying an altered video content item, according to various embodiments. In some embodiments, as shown at procedure 690, responsive to determining that the digital video content item is altered, the digital video content item is forwarded to a human operator for visual confirmation that the digital video content item is altered. In some embodiments, as shown at procedure 695, responsive to receiving a confirmation from the human operator that the digital video content item is altered, the digital video content item is used for training automated alteration analysis of digital video content.

CONCLUSION

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. Many aspects of the different example embodiments that are described above can be combined into new embodiments. The description as set forth is not intended to be exhaustive or to limit the embodiments to the precise form disclosed. Rather, the specific features and acts described above are disclosed as example forms of implementing the claims.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A computer-implemented method for identifying altered digital video content, the method comprising:
    accessing, at a computer system, a digital video content item;
    identifying, at the computer system, a visually identifiable region within the digital video content item;
    applying, at the computer system, a mask to the visually identifiable region of the digital video content item, wherein the mask blocks the visually identifiable region of the digital video content item;
    comparing, at the computer system, the digital video content item with the mask to other digital video content items, wherein the comparing disregards the visually identifiable region according to the mask;
    provided the digital video content is identified as similar to at least one other digital video content item, comparing, at the computer system, the visually identifiable region of the digital content video item to a visually identifiable region of the at least one other digital video content item; and
    provided the visually identifiable region of the digital content video item does not match the visually identifiable region of the at least one other digital video content item, determining, at the computer system, that the digital video content item is altered.

2. The method of claim 1, wherein the comparing, at the computer system, the digital video content item with the mask to other digital video content items comprises:
    generating a plurality of perceptual hashes for frames of the digital video content item; and
    comparing the plurality of perceptual hashes for frames of the digital video content item to perceptual hashes for frames of the other digital video content items.

3. The method of claim 2, wherein the comparing, at the computer system, the digital video content item with the mask to other digital video content items further comprises:
    determining distances between the perceptual hashes for frames of the digital video content item and the perceptual hashes for frames of the other digital video content items; and
    provided at least a portion of the distances satisfy a distance threshold between the digital video content item and one other digital video content item, identifying the digital video content item as similar to the one other digital video content item.

4. The method of claim 1, wherein the comparing, at the computer system, the visually identifiable region of the digital content video item to the visually identifiable region of the at least one other digital video content item comprises:
    generating a plurality of perceptual hashes corresponding to the visually identifiable region for frames of the digital video content item; and
    comparing the plurality of perceptual hashes corresponding to the visually identifiable region for frames of the digital video content item to perceptual hashes corresponding to the visually identifiable region for frames of the at least one other digital video content items.

5. The method of claim 4, wherein the comparing, at the computer system, the visually identifiable region of the digital content video item to the visually identifiable region of the at least one other digital video content item further comprises:
    generating the plurality of perceptual hashes for the visually identifiable region for frames of the at least one other digital video content item.

6. The method of claim 1, further comprising:
    responsive to determining that the digital video content item is altered, forwarding, at the computer system, the digital video content item to a human operator for visual confirmation that the digital video content item is altered.

7. The method of claim 6, further comprising:
    responsive to receiving a confirmation from the human operator that the digital video content item is altered, using, at the computer system, the digital video content item for training automated alteration analysis of digital video content.

8. The method of claim 1, wherein the visually identifiable region comprises a face.

9. The method of claim 8, wherein the identifying, at the computer system, the visually identifiable region within the digital video content item comprises:
    using facial recognition to automatically identify the visually identifiable region comprising the face.

10. The method of claim 1, wherein the digital video content item is a short form looping prerecorded video file.

11. A non-transitory computer readable storage medium having computer readable program code stored thereon for causing a computer system to perform a method for identifying altered digital video content, the method comprising:
    accessing a digital video content item;
    automatically identifying a facial region within the digital video content item using facial recognition;
    applying a mask to the facial region of the digital video content item, wherein the mask blocks the facial region of the digital video content item;
    comparing the digital video content item with the mask to other digital video content items, wherein the comparing disregards the facial region according to the mask;
    provided the digital video content is identified as similar to at least one other digital video content item, comparing the facial region of the digital content video item to a facial region of the at least one other digital video content item; and
    provided the facial region of the digital video content item does not match the facial region of the at least one other digital video content item, determining that the digital video content item is altered.

12. The non-transitory computer readable storage medium of claim 11, wherein the comparing the digital video content item with the mask to other digital video content items comprises:
    generating a plurality of perceptual hashes for frames of the digital video content item; and comparing the plurality of perceptual hashes for frames of the digital video content item to perceptual hashes for frames of the other digital video content items.

13. The non-transitory computer readable storage medium of claim 12, wherein the comparing the digital video content item with the mask to other digital video content items further comprises:
determining distances between the perceptual hashes for frames of the digital video content item and the perceptual hashes for frames of the other digital video content items; and
provided at least a portion of the distances satisfy a distance threshold between the digital video content item and one other digital video content item, identifying the digital video content item as similar to the one other digital video content item.

14. The non-transitory computer readable storage medium of claim 11, wherein the comparing the facial region of the digital content video item to the facial region of the at least one other digital video content item comprises:
generating a plurality of perceptual hashes corresponding to the facial region for frames of the digital video content item; and
comparing the plurality of perceptual hashes corresponding to the facial region for frames of the digital video content item to perceptual hashes corresponding to the facial region for frames of the at least one other digital video content items.

15. The non-transitory computer readable storage medium of claim 14, wherein the comparing the facial region of the digital content video item to the facial region of the at least one other digital video content item further comprises:
generating the plurality of perceptual hashes for the facial region for frames of the at least one other digital video content item.

16. The non-transitory computer readable storage medium of claim 11, the method further comprising:
responsive to determining that the digital video content item is altered, forwarding the digital video content item to a human operator for visual confirmation that the digital video content item is altered.

17. The non-transitory computer readable storage medium of claim 16, the method further comprising:
responsive to receiving a confirmation from the human operator that the digital video content item is altered, using the digital video content item for training automated alteration analysis of digital video content.

18. The non-transitory computer readable storage medium of claim 11, wherein the digital video content item is a short form looping prerecorded video file.

19. A computer system comprising:
a data storage unit; and
a processor coupled with the data storage unit, the processor configured to:
access a digital video content item;
identify a visually identifiable region within the digital video content item;
apply a mask to the visually identifiable region of the digital video content item, wherein the mask blocks the visually identifiable region of the digital video content item;
compare the digital video content item with the mask to other digital video content items while disregarding the visually identifiable region according to the mask;
provided the digital video content is identified as similar to at least one other digital video content item, compare the visually identifiable region of the digital content video item to a visually identifiable region of the at least one other digital video content item; and
provided the visually identifiable region of the digital content video item does not match the visually identifiable region of the at least one other digital video content item, determine that the digital video content item is altered.

20. The computer system of claim 19, wherein the processor is further configured to:
generate a plurality of perceptual hashes for frames of the digital video content item;
compare the plurality of perceptual hashes for frames of the digital video content item to perceptual hashes for frames of the other digital video content items;
determine distances between the perceptual hashes for frames of the digital video content item and the perceptual hashes for frames of the other digital video content items; and
provided at least a portion of the distances satisfy a distance threshold between the digital video content item and one other digital video content item, identify the digital video content item as similar to the one other digital video content item.

* * * * *